United States Patent [19]

Bertola et al.

[11] Patent Number: 5,222,591
[45] Date of Patent: Jun. 29, 1993

[54] ROTARY PIPE AND FIXED CHANNEL AUGER WITH INTERMEDIATE OUTER SUPPORTING ELEMENTS

[76] Inventors: Roberto Bertola, Via Lombardia, 29, 46019 - Viadana (MN); Dante Moroni, Via Soncinese, 2/A, 26011 - Casalbuttano (CR), both of Italy

[21] Appl. No.: 914,805

[22] Filed: Jul. 16, 1992

[30] Foreign Application Priority Data

Jul. 23, 1991 [IT] Italy .................. MI91A-02031

[51] Int. Cl.$^5$ ............................................ B65G 33/32
[52] U.S. Cl. ...................................... 198/672; 198/673
[58] Field of Search ............................ 198/672, 673

[56] References Cited

U.S. PATENT DOCUMENTS 371,609 10/1887 Marr ................................. 198/672

FOREIGN PATENT DOCUMENTS

| 2637268 | 2/1978 | Fed. Rep. of Germany ...... 198/673 |
| 3404896 | 9/1985 | Fed. Rep. of Germany ...... 198/672 |
| 0056411 | 5/1981 | Japan ...................................... 198/673 |
| 286558 | 8/1971 | U.S.S.R. ............................... 198/672 |
| 302294 | 3/1972 | U.S.S.R. ............................... 198/673 |
| 574376 | 9/1977 | U.S.S.R. ............................... 198/673 |
| 0713784 | 2/1980 | U.S.S.R. ............................... 198/673 |
| 0891534 | 12/1981 | U.S.S.R. ............................. 198/672 |
| 1004220 | 3/1983 | U.S.S.R. ............................... 198/673 |

*Primary Examiner*—D. Glenn Dayoan
*Attorney, Agent, or Firm*—Bucknam and Archer

[57] ABSTRACT

A rotary pipe and fixed channel auger with intermediate outer supporting elements includes alternated portions of a rotary spiral, within the fixed outer channel and, respectively, of a fixed spiral clamped within an outer pipe which turns rigidly therewith, the portions of rotary pipe having preferably a like length and bearing on outer supporting elements which substantially includes pairs of centering rollers connected by shafts which are parallel to the axis of the spiral.

5 Claims, 2 Drawing Sheets

ROTARY PIPE AND FIXED CHANNEL AUGER WITH INTERMEDIATE OUTER SUPPORTING ELEMENTS

BACKGROUND OF THE INVENTION

The present invention relates to a rotary pipe and fixed channel auger with intermediate outer supporting elements.

As is known there are at present used several industrial open conveying systems of the belt, roller, bucket, truck, chain type, which are affected by noise and difficult maintenance problems, in addition to having a comparatively high installation cost.

Comparatively noiseless conveying systems, which do not cause any alterations of the materials, are the so-called closed systems, including the augers, or Archimedean screws, including a helical surface which turns inside a pipe which may be integral therewith or be separated therefrom.

They are conventionally used in several systems for conveying solid materials, either in a granular or liquid condition, or for mixing different materials.

Also known is an auger sorter, in which the auger is fixed and has a vertical axis.

In this device, the auger operates as a slightly slanted fixed channel, for discharging at a low speed loose materials and the like.

The conveying augers usually comprise two different types of assemblies: the first includes the spiral which is separated from the perimetrical pipe and is called, perhaps not properly, auger; the second has its full or partial spiral affixed within the rotary pipe and is usually called "rotary tube".

The industrial type of auger is mainly used for horizontal conveyance.

Rarely it is also used for conveying materials on slight slopes, these materials consisting of loose solid materials or dense liquids. For conveying granular solid materials there are conventionally used vertical augers.

The conveying device is loaded at any set region of the path, and it is likewise unloaded, by opening the bottom of the channel. The drive is provided by a longitudinal central shaft, of hollow construction, usually made of steel and supported by supporting elements spaced from one another by 2.5-3.5 m.

Several types of spirals are used and, more specifically, an iron sheet spiral, a ribbon or belt spiral, a blade spiral including a plurality of blades operating as the blade elements of a propeller, and allowing the advancing speed of the material to be changed by changing the angles of the blades, as well as a fixed-spiral auger made of a manganese steel alloy for conveying materials having high abrading properties.

Only by using comparatively great diameter shafts it has been possible to make great length of augers, having a length of up to 50 m; the diameter of the shaft being increased from 140 to 300 mm and that of the outer channel from 400 to 630 mm, the supporting elements being spaced by 7-8 up to a maximum of 10 m and, for greater spacings, several series arranged augers must be provided.

These prior auger devices, however, are affected by great problems: in fact, the volumetric mass of material which can be conveyed, that is the conveying capability of the auger is greatly reduced, the power required for driving the auger increasing proportionately to the resistances to the movements and, simultaneously, the device has a poor reliability and requires frequently maintenance operations.

Independently from its size, the spiral is interrupted at each supporting elements, with consequent great difficulties from the conveyance standpoint, and with the possibility of jams, as powder or paste materials are conveyed.

Moreover, the intermediate supporting elements are subjected to a high corrosion and, because of friction, the temperature can excessively increase so as to cause fires or explosions, whereas some types of chemical products tend to cure under high temperatures, so as to cause the above mentioned jams.

In order to reduce the maintenance difficulties, prior auger devices include a half-cut bearing element, which can be opened in order to access the support member without disassembling the auger and, usually, several augers are series arranged with consequent greater costs for the motors, electric controls and so on.

SUMMARY OF THE INVENTION

Thus, the aim of the present invention is to solve the above disclosed problems and overcome the drawbacks affecting the intermediate supporting elements at present provided for supporting auger assemblies used for industrial closed conveying systems.

Within the scope of the above aim, e main object of the present invention is to provide a supporting element which allows the conveyance capability of the auger to be increased, without increasing the size of the outer channel and the diameter of the driving shaft.

Another object of the present invention is to obtain the above mentioned results without increasing the labour necessary for assembling the auger systems or the cost thereof.

Yet another object of the invention is to provide an auger apparatus for conveying materials which has a very reduced power consume, and a very high conveyance capability.

According to one aspect of the present invention, the above mentioned aim and objects, as well as yet other objects, which will become more apparent hereinafter, are achieved by a fixed channel and rotary pipe auger with outer intermediate supporting elements, characterized in that said auger comprises alternated portions of a rotary spiral within the fixed outer channel and, respectively, of a fixed spiral clamped within an outer pipe turning rigidly with said fixed spiral.

BRIEF DESCRIPTION OF THE DRAWINGS

Further characteristics and advantages of the fixed channel and rotary pipe auger, provided with outer intermediate supporting elements, according to the present invention, will become more apparent hereinafter, from the following detailed disclosure of some preferred embodiments thereof, which are illustrated by way of a merely indicative, but not limitative, example in the figures of the accompanying drawing, where.

DESCRIPTION OF THE PREFERRED EMBODIMENT

Figure 1:
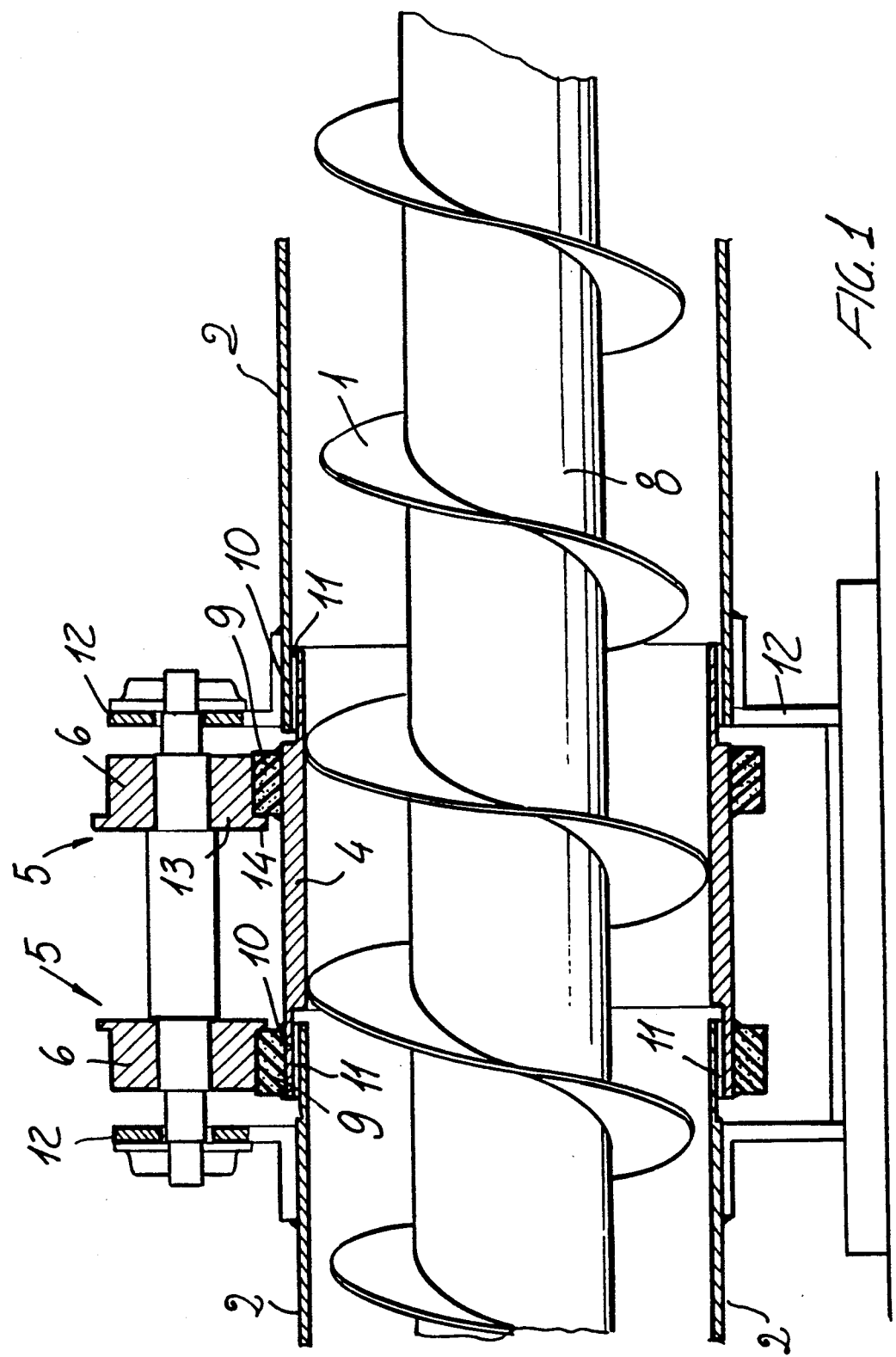
FIG. 1 illustrates a side view of the auger, in which the rotary pipe has been shown partially cross-sectioned.
Figure 2:
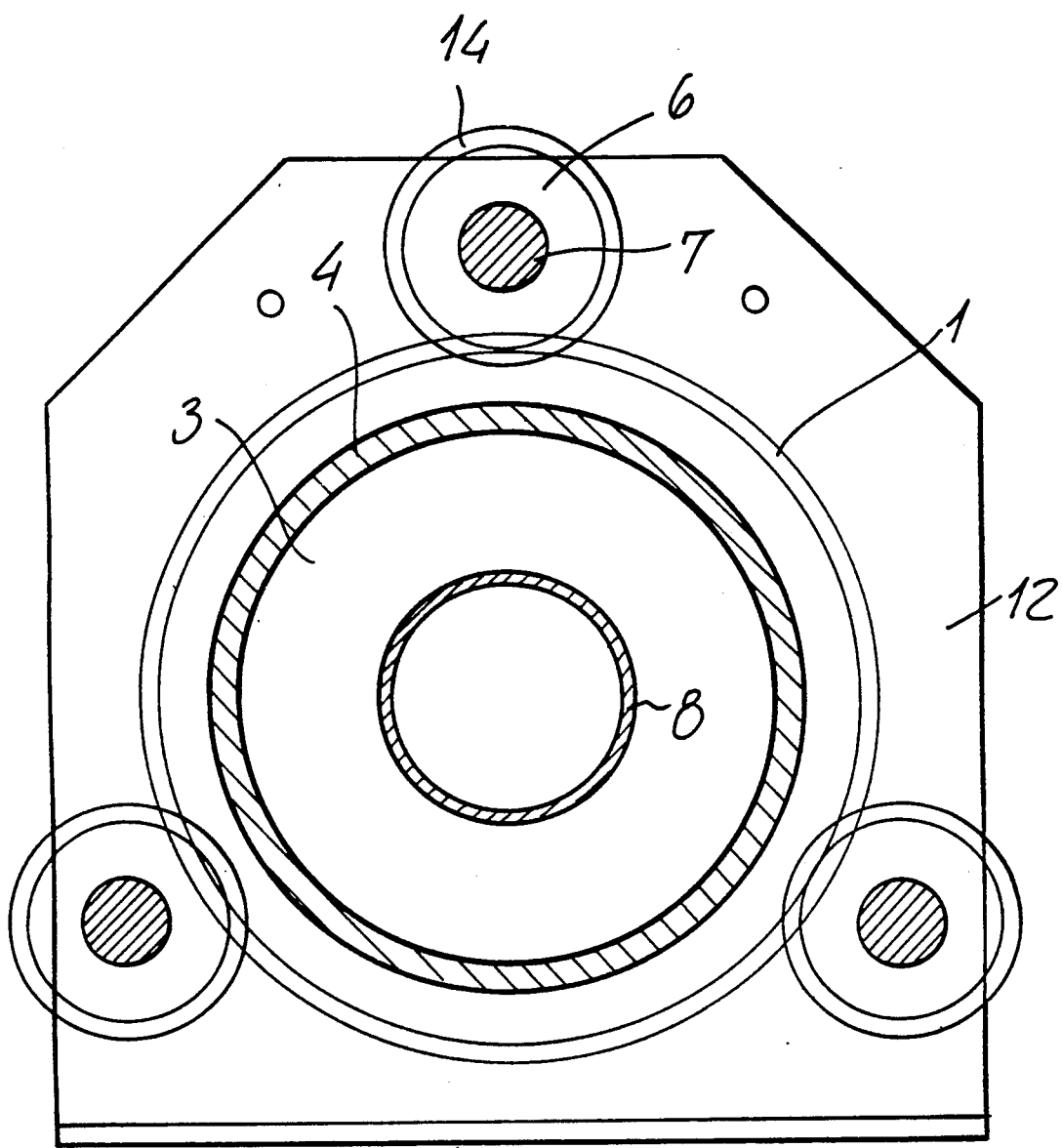
FIG. 2 is a front cross-sectional view of the auger according to the present invention.

With reference to the figures of the accompanying drawings, the fixed channel and rotary pipe auger according to the invention comprises a plurality of alternated portions of a rotary spiral 1 within an outer fixed channel 2 and, respectively, of a fixed spiral 3 which is clamped within an outer pipe 4 which can turn rigidly with the fixed spiral.

According to a preferred embodiment of the invention, the rotary pipe portions 4 have a like length and bear on outer supporting elements 5.

Said supporting elements 5 are substantially formed by pairs of centering rollers 6, which are connected by shafts 7 parallel to the axis 8 of the spiral 3.

In a further preferred embodiment, the pairs of rollers 6 are three in number, and are symmetrically spaced on the circumference of the pipe 4.

At the centering rollers 6, the outer surface of the rotary pipes 4 is provided with guides or tracks 9 having a circular crown arrangement.

In particular, the tracks 9 are specifically processed in order to provide good sliding properties.

The fixed channel portions 2 and rotary pipes 4, alternatively, can be made as an outer jacket, at the end superimposed portions thereof, so as to define a single containing tubular body.

The mutual sealing of said fixed channel portions 2 and rotary pipes 4 is assured by suitable gaskets 11 made of any suitable abrasion resisting material.

The outer roller supporting shafts 7 are supported by a supporting frame 12 which is welded to the fixed outer channel 2.

The rollers 6 have the rims thereof provided with an edge portion 14 adapted to abut on the inner face of the sliding guides 9.

From the above disclosure and the figures of the accompanying drawings, it should be apparent that the invention fully achieves the intended aim and objects.

In particular, there are solved the technical and economic problems of prior supporting elements which are at present used inside the channels, with respect to the conveyance capability of the auger, the resistance to the movement, reliability and maintenance.

Moreover, there are enhanced the conveyance properties for loose materials such as cereals, meals, cement powders, as well as wood meals and pastes.

In fact, owing to the invention, it is possible to achieve, since the cost increase of the new supporting elements is counterbalanced by the smaller diameter of the channel, with a consequent smaller consume of materials, the high longitudinal extensions necessary in the processing industries, without increasing the cost for unit of length.

While the invention has been illustrated and disclosed with reference to preferred embodiments thereof, it should be apparent that the disclosed embodiments are susceptible to several modifications and variations all of which will come within the spirit and scope of the appended claims.

We claim:

1. A fixed channel and rotary pipe auger with outer intermediate supporting means, said auger comprising a rotary axis rigidly supporting spiral means, said spiral means including a plurality of first spiral portion means encompassed by fixed outer channel means and second spiral portion means rigid with rotary outer pipe portion means, said rotary outer pipe portion means being coaxial with said fixed outer channel means so as to define a single tubular containing body and being supported rotatably on said intermediate supporting means, said intermediate supporting means comprising pairs of centering roller means connected by shaft means parallel to said rotary axis.

2. An auger according to claim 1, wherein said outer pipe portion means have an outer surface provided, at said centering roller means, with a plurality of circular low friction sliding tracks.

3. An auger according to claim 1, wherein said pairs of centering roller means comprise three pairs of rollers means symmetrically spaced on a circumference of said rotary outer pipe portion means.

4. An auger according to claim 1, wherein said shaft means connecting said roller means are supported by a supporting frame welded to said fixed outer channel means.

5. An auger according to claim 2, wherein said roller means comprise roller elements having portions provided with edges adapted to abut against an inner surface of said tracks.

* * * * *